United States Patent
Liu (10) Patent No.: US 10,915,615 B2
(45) Date of Patent: Feb. 9, 2021

(54) SENSING DEVICE AND TERMINAL DEVICE

(71) Applicant: SHENZHEN GOODIX TECHOLOGY CO., LTD., Guangdong (CN)

(72) Inventor: Xiangying Liu, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 74 days.

(21) Appl. No.: 16/166,670

(22) Filed: Oct. 22, 2018

(65) Prior Publication Data
US 2019/0057243 A1  Feb. 21, 2019

Related U.S. Application Data

(63) Continuation of application No. PCT/CN2017/073399, filed on Feb. 13, 2017.

(51) Int. Cl.
*G06F 21/32*        (2013.01)
*G06K 9/00*         (2006.01)
(Continued)

(52) U.S. Cl.
CPC ............... *G06F 21/32* (2013.01); *G06K 9/00* (2013.01); *G06K 9/00013* (2013.01);
(Continued)

(58) Field of Classification Search
CPC ...... G06K 9/00013; G06K 9/00; G06K 9/209; G06F 3/0516; G06F 21/32; H04M 1/22; H04M 1/26
(Continued)

(56) References Cited

U.S. PATENT DOCUMENTS

2003/0103686 A1* 6/2003 Ogura ............... G06K 9/00013
382/321
2010/0207890 A1* 8/2010 Chen .................... G06F 3/0416
345/173
(Continued)

FOREIGN PATENT DOCUMENTS

CN   101419522 A   4/2009
CN   101799734 A   8/2010
(Continued)

OTHER PUBLICATIONS

Extended European Search Report for European Application No. 17895728.8 dated May 9, 2019.

*Primary Examiner* — Bryon T Gyllstrom
(74) *Attorney, Agent, or Firm* — Heslin Rothenberg Farley & Mesiti P.C.

(57) ABSTRACT

For biometric technologies, a sensing device and a terminal device are provided. The sensing device includes a circuit board, a biometric sensor, at least one light-emitting element, a cover with a light-transmitting region, a light guide plate, and a light concentrating structure. The biometric sensor is installed on the circuit board. The light guide plate is fixed between the biometric sensor and the cover. The light concentrating structure is disposed on the light guide plate and corresponds to the light-transmitting region. The light-emitting element is installed on the circuit board and positioned on one side of the biometric sensor; and the light-emitting element has a side light-emitting end, and the side light-emitting end corresponds to the light guide plate.

16 Claims, 5 Drawing Sheets

(51) Int. Cl.
*G06K 9/20* (2006.01)
*H04M 1/22* (2006.01)
*H04M 1/26* (2006.01)
*F21V 8/00* (2006.01)

(52) U.S. Cl.
CPC .............. *G06K 9/209* (2013.01); *H04M 1/22* (2013.01); *H04M 1/26* (2013.01); *G02B 6/0083* (2013.01)

(58) Field of Classification Search
USPC ........................................................ 362/618
See application file for complete search history.

(56) References Cited

U.S. PATENT DOCUMENTS

| | | | | |
|---|---|---|---|---|
| 2010/0259503 | A1* | 10/2010 | Yanase | G06F 3/0416 345/174 |
| 2012/0321149 | A1* | 12/2012 | Carver | G06K 9/0004 382/124 |
| 2015/0049285 | A1* | 2/2015 | Qian | G02B 6/002 349/106 |
| 2015/0310251 | A1* | 10/2015 | Wyrwas | G06K 9/00046 348/77 |
| 2017/0076133 | A1* | 3/2017 | Hillmann | G06T 7/11 |
| 2017/0124376 | A1* | 5/2017 | Wyrwas | G06K 9/00013 |
| 2017/0185234 | A1* | 6/2017 | Zhang | G06F 3/0428 |
| 2017/0270342 | A1* | 9/2017 | He | G06F 3/042 |
| 2018/0018496 | A1* | 1/2018 | Hung | G06K 9/00 |

FOREIGN PATENT DOCUMENTS

| | | |
|---|---|---|
| CN | 102968217 A | 3/2013 |
| CN | 2033537424 U | 9/2014 |
| CN | 104463107 A | 3/2015 |
| CN | 105550664 A | 5/2016 |
| CN | 105556443 A | 5/2016 |
| CN | 106339662 A | 1/2017 |
| CN | 206515844 U | 9/2017 |
| EP | 2131322 A1 | 12/2009 |
| JP | 2002117393 A | 4/2002 |
| JP | 2022117393 A | 4/2002 |

* cited by examiner

… those exemplary illustrations do not constitute a limitation to the embodiments; components with the same reference numbers in the accompanying drawings represent similar components, and unless specified otherwise, the figures in the accompanying drawings do not constitute a limitation to proportion.

DETAILED DESCRIPTION

In order to make objects, technical solutions and advantages of this disclosure more apparent, each embodiment of this disclosure will be illustrated in detail in connection with the accompanying drawings. However, those skilled in the art can understand that in each embodiment of this disclosure, many technical details are proposed in order to make readers understand this disclosure better. But even if there are not those technical details and various changes and modifications based on each embodiment hereinafter, the technical solutions claimed for protection by this disclosure can also be implemented.

Figure 1:
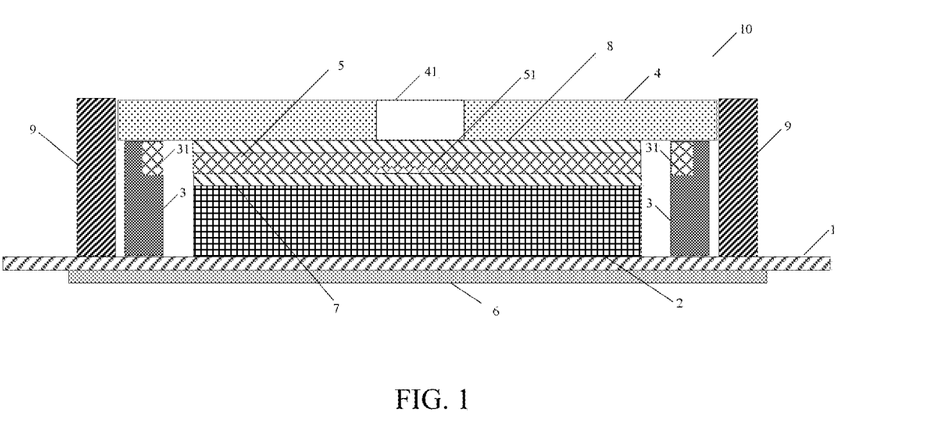
FIG. 1 is a structural schematic diagram of a sensing device according to a first embodiment of this disclosure.

A first embodiment of this disclosure relates to a sensing device, applied to electronic devices, such as a mobile phone, a notebook computer and the like. As shown in FIG. 1, the sensing device 10 includes: a circuit board 1, a biometric sensor 2, at least one light-emitting element 3, a cover 4 with a light-transmitting region 41, a light guide plate 5 and a light concentrating structure 51.

The biometric sensor 2 is installed on the circuit board 1, and the biological sensor 2 may be a fingerprint identification sensor. The circuit board 1 may be a flexible printed circuit (FPC) board, and preferably, with reference to FIG. 1, the sensing device 10 may further include a stiffening plate 6, and the stiffening plate 6 is fixed onto a lower surface of the circuit board 1 so as to stiffen structural hardness of the circuit board 1.

The light guide plate 5 is fixed between the biometric sensor 2 and the cover 4; the light concentrating structure 51 is disposed on the light guide plate 5 and corresponds to the light-transmitting region 41. In the embodiment, the light guide plate 5 is used as a medium for light path transmission, and a light concentrating process is performed at a position on an inner surface of the light guide plate 5, which corresponds to the light-transmitting region 41, so as to form the light concentrating structure 51. A material of the light guide plate 5 may be glass, sapphire, transparent polycarbonate (PC), polymethylmethacrylate (PMMA), thermoplastic polyurethanes (TPU), a thermoplastic elastomer (TPE) or polyethylene glycol terephthalate (PET), but is not limited thereto.

It should be noted that when the light guide plate 5 is made of glass or sapphire, the shape needs to be machined; and when the light guide plate 5 is made of transparent PC, PMMA, TPU, TPE or PET, the shape is processed by die cutting.

In the embodiment, the cover 4 is made of an opaque material, and the light-transmitting region 41 may be formed by digging a hole. Preferably, the light-transmitting region 41 may be filled with a light-transmitting material so as to keep integrity of the cover 4 and moreover, protect the biometric sensor 2. A filling material in the light-transmitting region 41 may be glass, sapphire or light-transmitting resin, but the embodiment does not make any limit thereto, and the filling material may be selected as required.

In the embodiment, with reference to FIG. 1, a fixing mode of the light guide plate 5 and the biometric sensor 2 as well as the cover 4 may be that: the light guide plate 5 is fixed with the biometric sensor 2 via a lower adhesive layer 7, and the light guide plate 5 is fixed with the cover 4 via an upper adhesive layer 8; but the embodiment is not limited thereto.

The light-emitting element 3 is installed on the circuit board 1 and positioned on one side of the biometric sensor 2. The light-emitting element 3 has a side light-emitting end 31, and the side light-emitting end 31 corresponds to a light incident end of the light guide plate 5. The light-emitting element 3 may be a light-emitting diode and is installed to the circuit board 1 by solder paste, and light with certain intensity is emitted from the side light-emitting end 31. It should be noted that the light-emitting element 3 in the embodiment may be more than one (in FIG. 1, a case that there are two light-emitting elements 3 is taken as an example), and specific positions and number of the light-emitting elements 3 need to be determined according to a shape of the light-transmitting region 41. For example, when the light-transmitting region 41 is close to a left side of the sensing device 10, one light-emitting element 3 may be installed on the left side of the biometric sensor 2; when the shape of the light-transmitting region 41 is relatively large, the light-emitting elements 3 may be installed in front and behind or on left and right sides of the biometric sensor 2; but the embodiment is not limited thereto.

Figure 2:
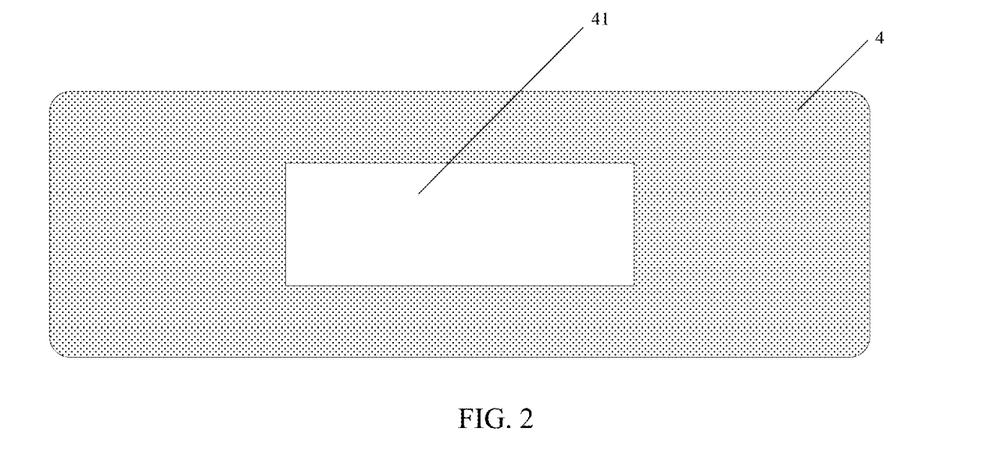
FIG. 2 is a top view schematic diagram of a light-transmitting region according to the first embodiment of this disclosure.

In the embodiment, with reference to FIG. 1, light emitted by the light-emitting element 3 from the side light-emitting end 31 is transmitted into the light guide plate 5, and is concentrated to the light-transmitting region 41 by the light concentrating structure 51 to form a light-transmitting effect. The light-emitting element 3 in the embodiment is a side light-emitting element, and thus, the light can be directly transmitted into the light guide plate 5 after emitting from the light-emitting element 3, and a transmission path of the light is relatively short, so that energy lost in the transmission process is relatively low. Moreover, the light concentrating structure 51 has relatively high light concentrating capacity and can transmit a great part of the light from the light guide plate 5 to the light-transmitting region 41, so that the light-transmitting region 41 has a good light-emitting effect. In other words, in the embodiment, the light-emitting element 3 is designed to be side light emission, and the light concentrating structure is added, so that ultrahigh light transmission efficiency can be achieved. Namely, in a case with a certain power of the light-emitting element 3, the structure in the embodiment actually can achieve a better light-transmitting effect. It should be noted that the light-transmitting region 41 in the embodiment may be more than one (in FIG. 2, a case that there is one light-transmitting region 41 is taken as an example), and the number of the light-transmitting region 41 can be set as required.

Preferably, with reference to FIG. 1, the sensing device 10 in the embodiment may further include a ring 9. The ring 9 is fixed to the circuit board 1. The ring 9, the cover 4 and the circuit board 1 form an accommodation space; and the biometric sensor 2, the light-emitting element 3 and the light guide plate 5 are all positioned in the accommodation space. In the embodiment, the ring 9 forms the accommodation space and beautifies appearance.

The ring 9 may be a hollow cylinder and is fixed to the circuit board 1, and a size of a section of the ring 9 is the same as that of the cover 4 so as to surround the cover 4.

The ring 9 may be a metal ring, and the metal ring is grounded. The ring 9 may be fixed to the circuit board 1 in a manner of adhering and fixing via an adhesive; and the embodiment does not limit it, and the manner is selected according to actual situations.

Preferably, the ring 9 may be slightly protruded out of the cover 4 to take a supporting effect so as to protect the cover 4.

Compared to the existing technology, in the embodiment of this disclosure, the light guide plate with the light concentrating structure is disposed right below the light-transmitting region of the cover, the light concentrating structure corresponds to the light-transmitting region, the light-emitting element emits the light to the light guide plate from the side light-emitting end, and the light is concentrated into the light-transmitting region by the light concentrating structure of the light guide plate to achieve the light-transmitting effect, so that an optical structure and a package structure are designed together, an existing light-transmitting module structure is simplified, and touch guidance is provided.

A second embodiment of this disclosure relates to a sensing device. The second embodiment is a refinement for the first embodiment, and the main refinement is that: in the embodiment, the light concentrating structure 51 of the light guide plate 5 is illustrated in detail.

In the embodiment, the light concentrating structure 51 includes a grating formed on the light guide plate 5 and non-conductive plating covered on a surface of the grating.

Figure 3A:
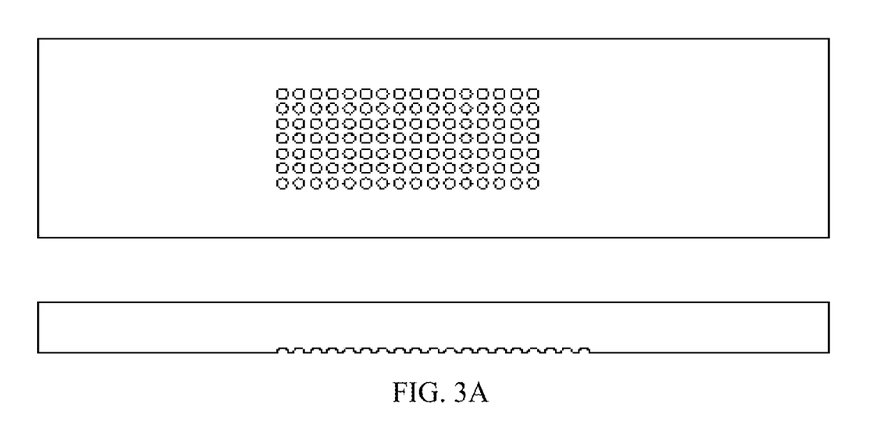
FIG. 3A is a schematic diagram that a grating is of a round structure according to a second embodiment of this disclosure.
Figure 3B:
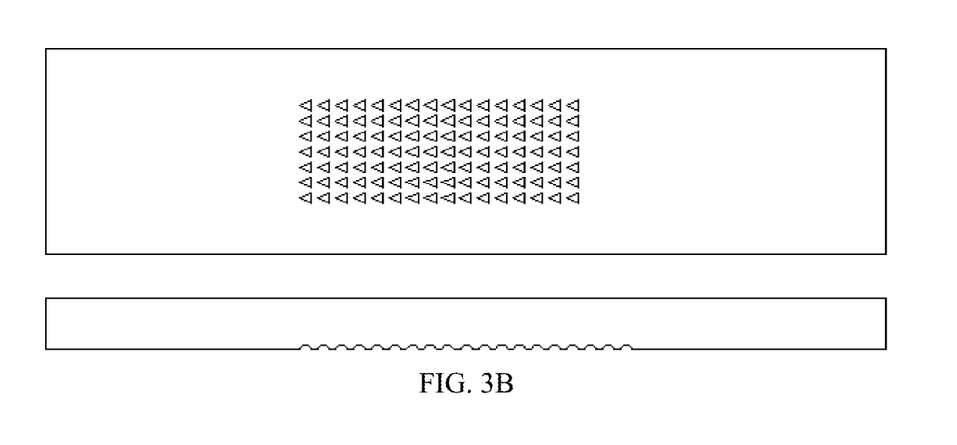
FIG. 3B is a schematic diagram that the grating is of a triangle structure according to the second embodiment of this disclosure.
Figure 3C:
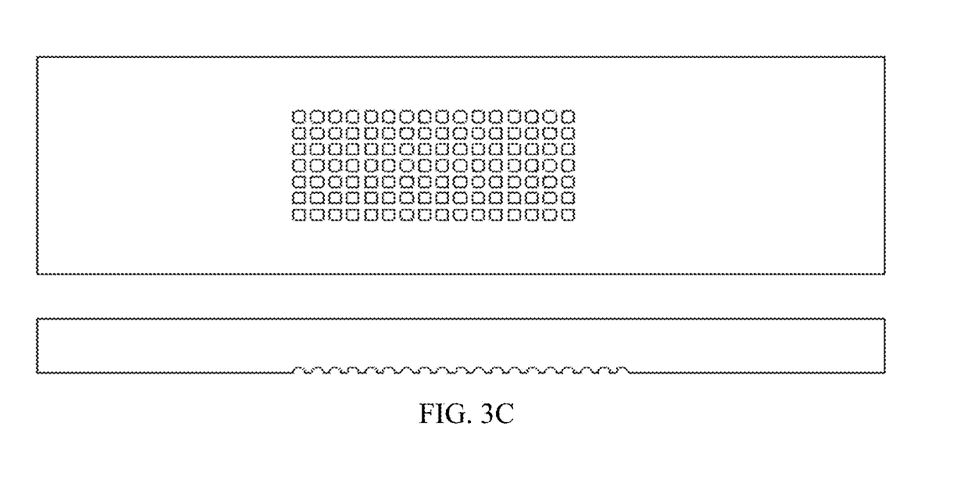
FIG. 3C is a schematic diagram that the grating is of a square structure according to the second embodiment of this disclosure.

In the embodiment, with reference to FIGS. 3A, 3B and 3C, according to the grating formed on the light guide plate 5, various types of grid points are distributed on a front surface of the light guide plate 5, and the shape of the points may be circle, triangle or square, but is not limited thereto. A specific distribution shape of the grid points of the light guide plate 5 is different in distribution according to different appearance demands of a product, and a thickness of the grid points may be between dozens of microns and hundreds of microns.

A processing method for the grid points may be a varnish silk printing process, ultraviolet (UV) transfer printing process, UV epoxy process or the like, so that light in the light guide plate 5 can be uniformly distributed.

In the embodiment, the non-conductive plating covered on the surface of the grating may be obtained by performing a non-conductive vacuum metallization (NCVM) process on the grating.

The embodiment, compared to the first embodiment, provides a light concentrating structure which includes the grating formed on the light guide plate and the non-conductive plating covered on the surface of the grating, wherein the grating is used for light transmission, and the non-conductive plating can prevent light reflection, so that the light is incident to the light-transmitting region to the greatest extent.

A third embodiment of this disclosure relates to a sensing device. The embodiment is substantially the same as the second embodiment, and the difference is that: the embodiment provides another light concentrating structure.

Figure 4:
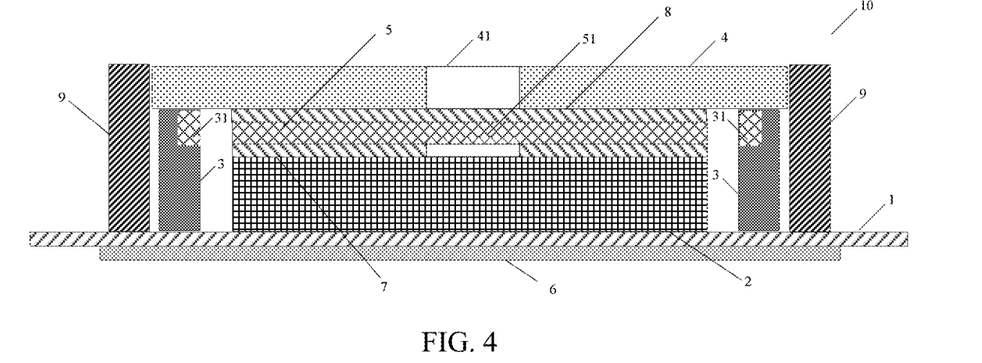
FIG. 4 is a structural schematic diagram of a sensing device according to a third embodiment of this disclosure.

The sensing device in the embodiment refers to FIG. 4, and the sensing device 10 further includes a lower adhesive layer 7. The light guide plate 5 is fixed on the biometric sensor 2 via the lower adhesive layer 7.

In the embodiment, the light concentrating structure 51 includes the grating formed on the light guide plate, and a reserved space formed in the lower adhesive layer 7 and in contact with the grating.

The grating formed on the light guide plate has been illustrated in detail in the second embodiment, and is not repeated herein.

The reserved space formed in the lower adhesive layer 7 and in contact with the grating may be implemented by cutting an opening in a position of the lower adhesive layer 7, which corresponds to the grating of the light guide plate 5, so as to reserve air to guide the light.

It should be noted that the lower adhesive layer 7 needs to meet a certain light transmittance and meet the deformation demand.

The embodiment, compared to the second embodiment, provides another light concentrating structure so as to facilitate flexible selection, and the embodiment can also be used as a refinement on the first embodiment and can achieve the same technical effects.

A fourth embodiment of this disclosure relates to a sensing device. The embodiment is an improvement based on the first embodiment, and the main improvement is that: with reference to FIG. 5, the cover 4 further includes a transparent board body 42 and an ink layer 43.

The ink layer 43 is covered on an inner surface of the transparent board body 42, and forms the light-transmitting region 41. In the embodiment, with reference to FIG. 5, the ink layer 43 may be subjected to hollow processing to form the light-transmitting region 41, and in this case, the light-transmitting region 41 may be letters or a pattern (which is shown as letters in FIG. 6).

Figure 5:
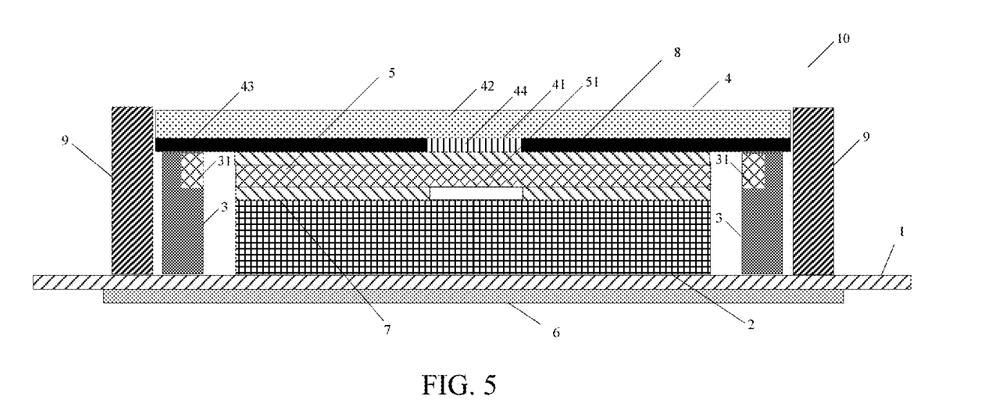
FIG. 5 is a structural schematic diagram of a sensing device according to a fourth embodiment of this disclosure.
Figure 6:
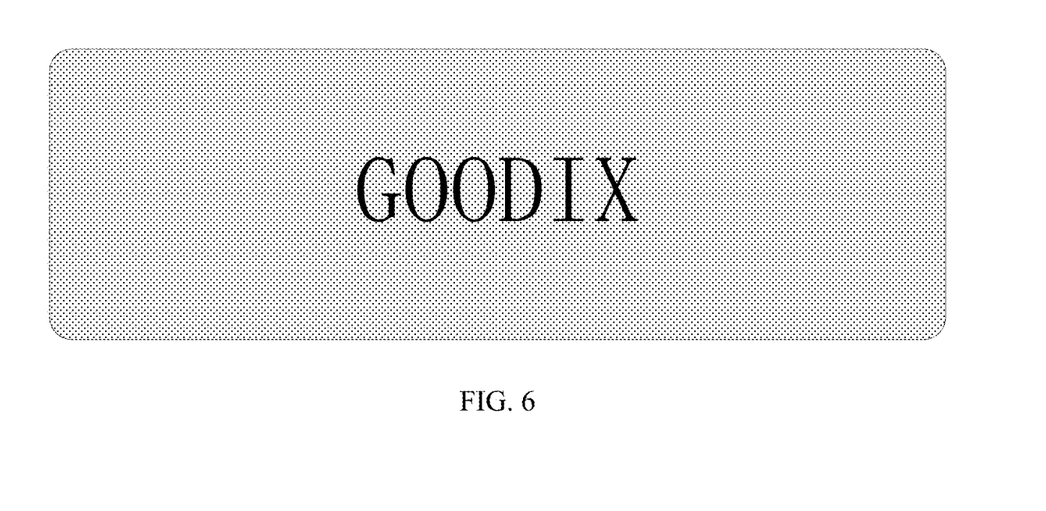
FIG. 6 is a top view schematic diagram of a light-transmitting region according to the fourth embodiment of this disclosure.

Preferably, in the embodiment, one surface of the ink layer 43, which faces the light guide plate 5, is a white surface layer. In the embodiment, the ink layer 43 may be a white ink layer; or the ink layer 43 has two ink sub-layers, the lower layer facing the light guide plate 5 is a white ink sub-layer so as to form the white surface layer, and a color of the other ink sub-layer may be set as required. The surface of the ink layer 43, which faces the light guide plate 5, is set as the white surface layer so as to further benefit light transmission.

Preferably, with reference to FIG. 5, the cover 4 may further include a transparent filling layer 44, and the transparent filling layer 44 is filled in the light-transmitting region 41.

The light-transmitting region 41 is filled with the transparent filling layer 44, so that a display effect of a pattern can be enhanced.

In the embodiment, a porous structure can also be formed at a position in the transparent board body 42, which corresponds to the light-transmitting region 41, so that the display effect of the pattern can also be enhanced.

It should be noted that the porous structure may be a blind hole structure or a through hole structure. When the porous structure is the blind hole structure, holes may be opened in the front surface or the back surface of the transparent board body 42.

The embodiment, compared to the first embodiment, provides a structure of the cover, which includes the transparent board body and the ink layer so as to meet the actual design demands, and moreover, provides a solution for forming the light-transmitting pattern so as to implement differentiation and individuation. The embodiment can also be used as the improvement on the basis of the second and third embodiments, and can achieve the same technical effects.

A fifth embodiment of this disclosure relates to a terminal device, including a housing and the sensing device 10 according to any one of the first embodiment to the fourth embodiment.

In the embodiment, the housing is provided with an opening, and the sensing device 10 is fixed to the housing and positioned in the opening.

Figure 7A:
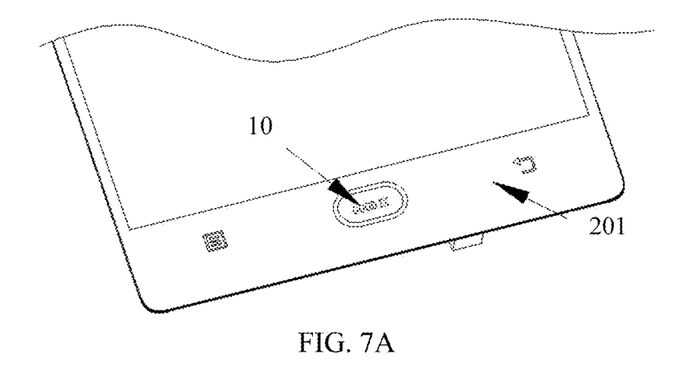
FIG. 7A is a structural schematic diagram that a sensing device is disposed in a front surface of a terminal device according to a fifth embodiment of this disclosure.
Figure 7B:
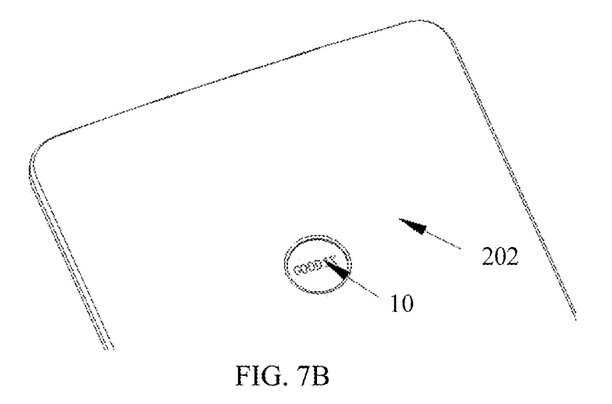
FIG. 7B is a structural schematic diagram that the sensing device is disposed in a back surface of the terminal device according to the fifth embodiment of this disclosure.
Figure 7C:
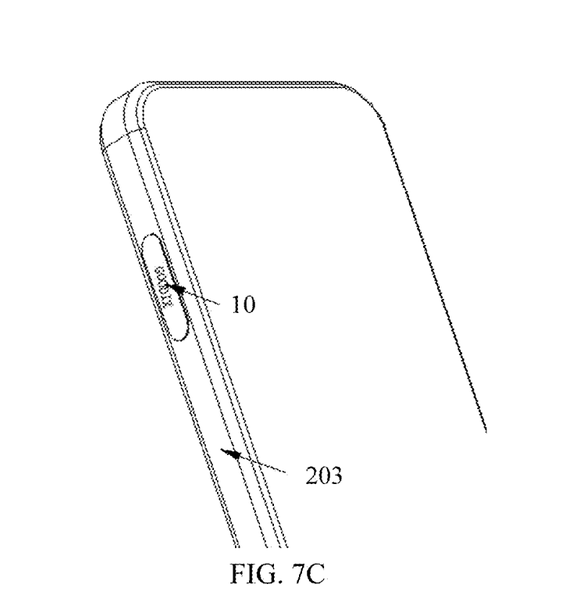
FIG. 7C is a structural schematic diagram that the sensing device is disposed in a side surface of the terminal device according to the fifth embodiment of this disclosure.

In the embodiment, with reference to FIGS. 7A, 7B and 7C, the terminal device may be a mobile phone or a tablet personal computer, the opening is formed in a front surface 201, a back surface 202 or a side surface 203 of the housing (in the figures, the mobile phone is taken as an example); namely, the sensing device 10 is disposed in the front surface, the back surface or the side surface of the terminal device.

Figure 7D:
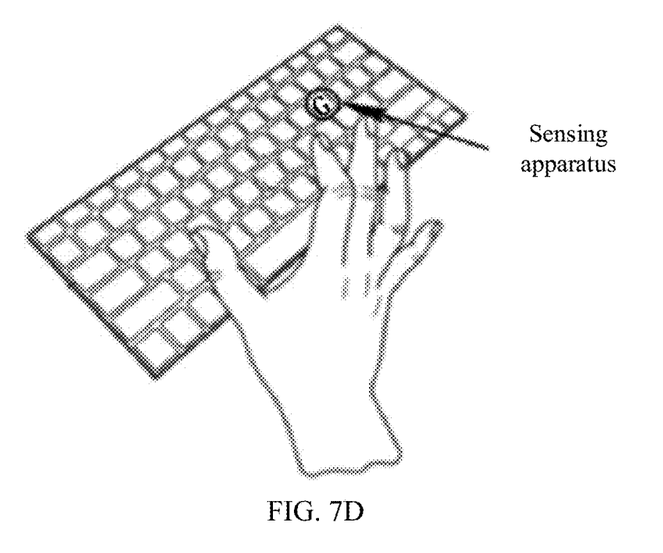
FIG. 7D is a structural schematic diagram that the terminal device is a keyboard according to the fifth embodiment of this disclosure.

In the embodiment, with reference to FIG. 7D, the terminal device may also be a keyboard and a mouse; in this case, the sensing device may be directly disposed in the keyboard or the mouse (in the drawing, the keyboard is taken as an example).

The embodiment, compared to the existing technology, provides the specific terminal device which can apply the sensing device and proves practicality of the terminal device.

Those skilled in the art can understand that each of the above-mentioned embodiments is the specific embodiment for implementing this disclosure, but in the practical disclosure, various changes can be made to the embodiments in form and in detail, without departure from the spirit and scope of this disclosure.

What is claimed is:

1. A sensing device comprising: a circuit board, a biometric sensor, at least one light-emitting element, a cover with a light-transmitting region, a light guide plate, and a light concentrating structure;
    wherein:
    the biometric sensor is installed on the circuit board;
    the light guide plate is fixed between the biometric sensor and the cover; the light concentrating structure is disposed on the light guide plate and corresponds to the light-transmitting region;
    the light-emitting element is installed on the circuit board and positioned on one side of the biometric sensor; the light-emitting element has a side light-emitting end, and the side light-emitting end corresponds to the light guide plate; and
    light emitted by the light-emitting element from the side light-emitting end is transmitted into the light guide plate, and is concentrated to the light-transmitting region by the light concentrating structure;
    wherein, the cover comprises a transparent board body and an ink layer; and the ink layer is covered on an inner surface of the transparent board body, and forms the light-transmitting region; and
    wherein a porous structure is formed at a position in the transparent board body, which corresponds to the light-transmitting region.

2. The sensing device according to claim 1, wherein the light concentrating structure comprises: a grating formed on the light guide plate; and non-conductive plating covered on a surface of the grating.

3. The sensing device according to claim 1, wherein the sensing device further comprises a lower adhesive layer, and the light guide plate is fixed to the biometric sensor via the lower adhesive layer; and
    the light concentrating structure comprises: a grating formed on the light guide plate, and a reserved space formed in the lower adhesive layer and in contact with the grating.

4. The sensing device according to claim 1, wherein one surface of the ink layer, which faces the light guide plate, is a white surface layer.

5. The sensing device according to claim 1, wherein, the cover further comprises a transparent filling layer, and the transparent filling layer is filled in the light-transmitting region.

6. The sensing device according to claim 1, wherein, the sensing device further comprises a ring, and the ring is fixed to the circuit board;
    the ring, the cover and the circuit board form an accommodation space; and
    the biometric sensor, the light-emitting element and the light guide plate are all positioned in the accommodation space.

7. The sensing device according to claim 1, wherein, the biometric sensor is a fingerprint identification sensor.

8. A terminal device comprising: a housing and a sensing device; wherein:
    the housing is provided with an opening, and the sensing device is fixed to the housing and positioned in the opening;
    the sensing device comprises a circuit board, a biometric sensor, at least one light-emitting element, a cover with a light-transmitting region, a light guide plate and a light concentrating structure;
    the biometric sensor is installed on the circuit board;
    the light guide plate is fixed between the biometric sensor and the cover; the light concentrating structure is disposed on the light guide plate and corresponds to the light-transmitting region;
    the light-emitting element is installed on the circuit board and positioned on one side of the biometric sensor; the light-emitting element has a side light-emitting end, and the side light-emitting end corresponds to the light guide plate; and
    light emitted by the light-emitting element from the side light-emitting end is transmitted into the light guide plate, and is concentrated to the light-transmitting region by the light concentrating structures;

wherein, the cover comprises a transparent board body and an ink layer; and the ink layer is covered on an inner surface of the transparent board body, and forms the light-transmitting region; and wherein a porous structure is formed at a position in the transparent board body, which corresponds to the light-transmitting region.

9. The terminal device according to claim 8, wherein the terminal device comprises a mobile phone or a tablet personal computer, and the opening is formed in a front surface, a back surface or a side surface of the housing.

10. The terminal device according to claim 9, wherein, the terminal device comprises a keyboard or a mouse.

11. The terminal device according to claim 8, wherein the light concentrating structure comprises: a grating formed on the light guide plate; and non-conductive plating covered on a surface of the grating.

12. The terminal device according to claim 8, wherein the sensing device further comprises a lower adhesive layer, and the light guide plate is fixed to the biometric sensor via the lower adhesive layer; and the light concentrating structure comprises: a grating formed on the light guide plate; and a reserved space formed in the lower adhesive layer and in contact with the grating.

13. The terminal device according to claim 8, wherein, one surface of the ink layer, which faces the light guide plate, is a white surface layer.

14. The terminal device according to claim 8, wherein, the cover further comprises a transparent filling layer, and the transparent filling layer is filled in the light-transmitting region.

15. The terminal device according to claim 8, wherein, the sensing device further comprises a ring, and the ring is fixed to the circuit board;

the ring, the cover and the circuit board form an accommodation space; and the biometric sensor, the light-emitting element and the light guide plate are all positioned in the accommodation space.

16. The terminal device according to claim 8, wherein, the biometric sensor is a fingerprint identification sensor.

\* \* \* \* \*